UNITED STATES PATENT OFFICE.

WILLIAM ORR, OF SALT LAKE CITY, UTAH, ASSIGNOR TO THE GOLD AND SILVER EXTRACTION COMPANY OF AMERICA, LTD., OF DENVER, COLORADO, A JOINT-STOCK COMPANY OF GREAT BRITAIN.

METHOD OF RECOVERING CYANIDS.

SPECIFICATION forming part of Letters Patent No. 687,258, dated November 26, 1901.

Application filed February 12, 1901. Serial No. 47,059. (No specimens.)

*To all whom it may concern:*

Be it known that I, WILLIAM ORR, a subject of the Queen of Great Britain, residing at Salt Lake City, in the State of Utah, have invented certain new and useful improvements in methods of recovering cyanids from weak or fouled solutions or of sodium from "weak" cyanid solutions and from "foul cyanid-mill solutions," of which the following is a full, clear, concise, and exact description, sufficient to enable any person skilled in the art to which it appertains to use the same.

My present invention relates to the recovery of cyanid from what are termed "weak" cyanid solutions and from "foul cyanid-mill solutions," the weak cyanid solutions referred to being such as usually result in the application of the well-known process of extracting precious metals from ores by dilute solutions of cyanid of potassium or other alkaline cyanid, particularly when such process has been applied to tailings or ores prepared or pulverized by what are known as "wet" methods. Such ores or tailings necessarily contain a very considerable percentage of water, even as high as twenty-five per cent. of their weight. The cynanid solutions applied to the ores or tailings thus prepared are used thereon repeatedly, the solutions, as is well understood, passing from the ores to contact with a precipitating agent, usually zinc, and being returned therefrom for repeated use upon a fresh charge of ore. As the tanks or other receptacles in which the solution is applied to the ore or tailings for the purpose of thus extracting the precious metals are limited in capacity, the addition of the water contained in each fresh charge necessarily involves the withdrawal of a corresponding amount of the solution. The solution having passed through the ore or tailings and thence through the precipitating apparatus is after being strengthened with this cyanid applied for repeated use upon a fresh charge located in another tank; but the charge of ore or tailings which was first operated upon retains in its wet condition approximately the same amount of the solution as of the water originally contained therein as the result of the aforesaid wet method. It is customary to displace this final residuum of the cyanid solution from the ore or tailings by the addition of water, and it is after such displacement carried down to a precipitating apparatus specially used thereon, where after leaving there the precious metals carried thereby it is in the ordinary practice of cyanid-mills allowed to run to waste, inasmuch as the tank capacity is, as aforesaid, limited, and the rejection of this weakest residuum of the solution affords the most economical, if not the only, way of regulating according to requirements the bulk of solution made use of in the mill. Such solution thus necessarily withdrawn is commonly designated "weak" cyanid solution, and the cyanid therein contained has hitherto been entirely lost. The said weak solutions also contain to some extent double cyanid of zinc and potassium, in which the cyanid is unavailable for dissolving the precious metals. On the other hand, many of the ores and tailings which are in practice subjected to treatment by said cyanid process for extracting precious metals therefrom contain salts which become incorporated in the solution and prove detrimental in that they act as retarding agents, and solutions thus affected by an excess of such salts with their contained cyanid may become essentially worthless for the purpose of extracting the precious metals and are technically termed on this account "foul" solutions.

Among the objects of my present invention are the recovery from such weak and foul solutions of the cyanid which otherwise would be lost and also the recovery of such cyanid in a condition immediately available for renewed use in the said process of extracting the precious metals from the ores or tailings in which they are contained. I obtain these objects by the following methods of treatment: I first determine the amount of free or available cyanid of potassium or sodium and also the amount of such cyanid combined with the zinc as the double cyanid of zinc and potassium as the same are contained in the said weak or foul solution. This may be effected in any convenient manner, as will be understood by those skilled in the art. I then withdraw and hold the said weak or foul solution in any convenient tank or receptacle and add thereto sufficient zinc (in the form of a soluble salt, preferably a fused chlorid of zinc) to precipitate all the cyanid in the solution as a single cyanid of zinc. The resulting reaction, so far as the single cyanid of potassium contained in the solution is concerned, may be expressed as follows, viz:

$$2KCy + ZnCl_2 = ZnCy_2 + 2KCl,$$

and the resulting reaction, so far as the double cyanid of zinc and potassium is concerned, may be expressed as follows, viz:

$$ZnCy_2 2KCy + ZnCl_2 = 2ZnCy_2 + 2KCl.$$

Pains should be taken to insure the completion throughout the mixture of the reactions mentioned, and this will be facilitated by agitation. I next allow the granular precipitate—the cyanid of zinc—to settle, and I withdraw therefrom in any convenient manner by decanting, filtering, or the like the supernatant liquor, which I allow to go to waste as of no value. I next collect the said precipitate of cyanid of zinc and transfer it into a smaller tank or receptacle, and I then add thereto a solution of alkaline hydrate, preferably sodium or potassium hydrate, or a hydrate of an alkaline earth, such as calcium hydrate or barium hydrate, or a combination of such hydrates, sufficient to dissolve the said precipitate of cyanid of zinc. The resulting reaction may be expressed as follows:

$$ZnCy_2 + 4NaOH = Zn(ONa)_2 + 2NaCy + 2H_2O.$$

The amount of hydrates so added will depend upon the quantity of the cyanid of zinc to be dissolved and can, as will be readily understood, be estimated on the basis of the test made in the first instance to determine the amount of free or available cyanid of potassium or sodium in the original solution, and any of the aforesaid hydrates or combinations thereof may be used, according to the special requirements of each case, depending upon economical or other considerations. I have, however, found in usual practice that excellent average, if not the best, results will be obtained under ordinary conditions by introducing at this stage of the process for every pound of zinc in the zinc precipitate two and one-half pounds of sodium hydrate and one pound of calcium hydrate. To this solution of zinc cyanid in alkaline hydrate I add a quantity of the fused sulfid of sodium or potassium or a sulfid of one of the alkaline earths sufficient to precipitate the zinc and liberate the cyanid as cyanid of sodium or potassium, the latter being thus secured in a concentrated solution and reavailable after requisite dilution with water for the extraction of the precious metals by the aforesaid cyanid proccesses.

My said invention is also of particular advantage in that it affords a simple and economical means of separating the cyanid of potassium or sodium from the aforesaid various injurious salts with which any solution may become infected during the extraction of the precious metals from their ores or tailings, as aforesaid.

Having described my invention, what I claim as new, and desire to secure by Letters Patent, is the following, viz:

1. The method of recovering cyanid of potassium or sodium from "weak" cyanid solutions and from "fouled cyanid-mill solutions" which consists in first adding to such solutions sufficient soluble salt of zinc, to precipitate the cyanid as the single cyanid of zinc, next separating and withdrawing the said precipitated zinc cyanid from such solution, next applying to the said precipitate a solution of alkaline hydrate, next adding to the resulting solution a soluble alkaline sulfid, and finally removing the precipitated zinc sulfid from said last-mentioned solution containing the desired cyanid of sodium and potassium, substantially as and for the purposes described.

2. The method of recovering cyanid of potassium or sodium from "weak" cyanid solutions and from "fouled cyanid-mill solutions" which consists in adding to the said solution sufficient soluble salt of zinc to precipitate the cyanid as the single cyanid of zinc, next separating and withdrawing from this solution the resulting granular precipitate, single cyanid of zinc, next applying to said precipitate a solution of alkaline hydrate, next adding to the said last-mentioned solution a soluble alkaline sulfid, next withdrawing from the said last-mentioned solution containing the desired cyanid of potassium or sodium, the precipitated zinc sulfid, substantially as and for the purposes described.

3. The method of recovering cyanid of potassium or sodium from "weak" cyanid solutions and from "fouled cyanid-mill solutions" which consists in adding to the said solution a soluble salt of zinc, next separating and withdrawing the resulting precipitated zinc cyanid from its solution, next applying to the said precipitate a solution of about two and one-half pounds of sodium hydrate and one pound of calcium hydrate to every pound of zinc in the said precipitate, next adding to this solution a soluble alkaline sulfid and finally separating and withdrawing from said last-mentioned solution containing the desired cyanid of potassium or sodium the resulting zinc sulfid, substantially as and for the purposes described.

WILLIAM ORR.

Witnesses:
WALTER D. EDMONDS,
GEORGE G. MEASURES.